United States Patent

Teuling et al.

[11] Patent Number: 5,565,744
[45] Date of Patent: Oct. 15, 1996

[54] WAVEFORM GENERATION

[75] Inventors: Dirk, J. A. Teuling; Hendrik Ten Pierick, both of Eindhoven, Netherlands

[73] Assignee: U.S. Philips Corporation, New York, N.Y.

[21] Appl. No.: 548,111

[22] Filed: Oct. 25, 1995

[30] Foreign Application Priority Data

Nov. 2, 1994 [EP] European Pat. Off. .............. 94203185

[51] Int. Cl.$^6$ ...................................... H01J 29/51
[52] U.S. Cl. ...................... 315/368.23; 315/371
[58] Field of Search ..................... 315/370, 371, 315/368.23, 368.18, 368.19; 348/807

[56] References Cited

U.S. PATENT DOCUMENTS

| | | |
|---|---|---|
| 4,524,307 | 6/1985 | Walquist . |
| 4,683,405 | 7/1987 | Truskalo et al. ................. 315/371 |
| 4,692,804 | 9/1987 | Aoki et al. . |
| 4,766,354 | 8/1988 | Oliver ............................. 315/371 |
| 4,816,908 | 3/1989 | Colineau et al. . |
| 4,935,674 | 6/1990 | Rodriguez-Cavazos . |
| 5,276,782 | 6/1994 | Nguyen . |
| 5,355,057 | 10/1994 | Edgar et al. ..................... 315/370 |
| 5,473,224 | 12/1995 | Tsujihara et al. .............. 315/368.18 |

FOREIGN PATENT DOCUMENTS

| | | | |
|---|---|---|---|
| 0516229A1 | 12/1992 | European Pat. Off. ......... H01J 29/51 |
| 2010052 | 6/1979 | United Kingdom ............. H04N 9/28 |

*Primary Examiner*—Theodore M. Blum
*Attorney, Agent, or Firm*—Edward W. Goodman

[57] ABSTRACT

A position-dependent waveform (WCi) is generated by generating a set of functions $(f_l(I1), \ldots, f_p(I1), g_l(If), \ldots, g_r(If))$ from position information (I1,If). A sub-set of functions $(f_{nl}(I1), \ldots, f_{nq}(I1), g_{nl}(If), \ldots, g_{ns}(If))$ is selected from this set of functions $(f_l(I1), \ldots, f_p(I1), g_1(If), \ldots, g_r(If))$. Only selected functions associated with the sub-set of functions $(f_{nl}(I1), \ldots, f_{nq}(I1), g_{nl}(If), \ldots, g_{ns}(If))$ are each multiplied by an associated coefficient (al, . . . ,aq,bl, . . . ,bs). The selected functions $(f_{nl}(I1), \ldots, f_{nq}(I1), g_{nl}(If), \ldots, g_{ns}(If))$ multiplied by an associated coefficient (al, . . . ,aq,bl, . . . ,bs) are added to form the position-dependent waveform (WCi).

10 Claims, 1 Drawing Sheet

WAVEFORM GENERATION

BACKGROUND OF THE INVENTION

1. Field of the Invention

The invention relates to a method of generating a position-dependent correction waveform by generating p functions $(f_1(I1), \ldots, f_p(I1))$ from position information (I1), in which p is a natural number larger than 1.

The invention also relates to a waveform-generating circuit comprising a function-generating circuit coupled to receive position information to supply p functions $(f_1(I1), \ldots, f_p(I1))$ of the position information, in which p is a natural number which is larger than 1.

The invention further relates to a picture display device in which the method is used for generating a position-dependent correction waveform.

Position-dependent correction waveforms are used in, inter alia dynamic convergence circuits, dynamic focusing circuits, east-west and north-south correction circuits, and luminance uniformity circuits.

2. Description of the Related Art

Such a waveform-generating circuit is known from GB-A-2010052. The known waveform-generating circuit generates convergence waveforms for driving convergence coils of a display tube.

A picture displayed on a display screen is formed in known manner in that an electron beam consisting of separate electron beams (generally representing the primary colors red, green and blue) is horizontally deflected (parallel to an x axis) by means of a horizontal deflection circuit comprising a horizontal deflection coil, and vertically deflected (parallel to an y axis) by means of a vertical deflection circuit comprising a vertical deflection coil. A convergence error, which may occur as a result of the fact that the separate electron beams reach the display screen with a mutual offset (in the x and/or y direction), is corrected by driving convergence coils with the convergence waveforms generated by the waveform-generating circuit. The extent of a required convergence correction depends on the design of, and tolerances in a combination of the display tube and the associated horizontal and vertical deflection coils. The convergence waveforms should have a shape in conformity with the convergence correction required by said combination. Moreover, the convergence waveforms should be adjustable so as to match the shape as much as possible with the required convergence correction and to compensate for said tolerances.

The known waveform-generating circuit receives a horizontal position signal, for example, the position on the x axis, and divides this horizontal position signal into p horizontal sub-areas with which the display screen may be considered to be divided into p vertical strips parallel to the y axis. The square of the horizontal position signal is generated in each horizontal sub-area and multiplied by an associated coefficient ai. Similarly, a vertical position signal, for example, the position on the y axis, is divided into q vertical sub-areas with which the display screen may be considered to be divided into q horizontal strips parallel to the x axis. The square of the vertical position signal is generated in each vertical sub-area and multiplied by an associated coefficient bj. The convergence waveform is obtained by adding all (p+q) coefficient-multiplied squares. In this case, the convergence correction can be adjusted to obtain an optimum convergence correction at p+q positions on the display screen by setting the coefficients associated with selected functions of the horizontal and vertical position information. The selected functions define the shape of the convergence waveform and are the squares in this case. The quality of the convergence correction between the adjustment positions is determined by the fact in how far the selected functions satisfactorily match the convergence correction required by the combination of the display tube and the associated horizontal and vertical deflection coils.

A drawback of the known waveform-generating circuit described in GB-A-2010052 is a small flexibility because exclusively squares are generated. The circuit is not very complex.

Such a waveform-generating circuit is also known from EP-A-0516229, corresponding to U.S. Pat. No. 5,435,536. An analog embodiment of the known waveform-generating circuit generates r powers of horizontal position information and s powers of vertical position information. Moreover, each r power of the horizontal position information is multiplied by each s power of the vertical position information for generating r times s crossterms.

A coefficient circuit supplies r coefficients, each of which is to be multiplied by a corresponding power of the horizontal position information, s coefficients, each of which is to be multiplied by a corresponding power of the vertical position information, and r times s coefficients, each of which is to be multiplied by a corresponding cross-term. The waveform generated by the known waveform-generating circuit is obtained by adding all r and s coefficient-multiplied powers to the r times s coefficient-multiplied cross-terms.

A digital embodiment of the known waveform-generating circuit converts the analog horizontal and vertical position information, into digital position words, whereafter a microcomputer computes the waveform. To this end, said powers and cross-terms are computed on the basis of the digital position words, and each of said powers and cross-terms is multiplied by an associated coefficient and added together to form a sum. The coefficients are stored in a non-volatile, writable memory. The sum is convened into the waveform via a D/A converter. The microcomputer is often not fast enough so that upon start-up of the waveform-generating circuit, a scratch memory is filled with a coefficient-based interpolation software which comprises a much larger number of points than the number of coefficients. This working memory is addressed with the digital position words.

In this case, the convergence correction can be adjusted to obtain an optimum convergence correction at r plus s plus r times s positions on the display screen by setting the coefficients associated with selected functions of the horizontal and vertical position information, in this case, powers of the horizontal and vertical position information and their crossterms.

A drawback of the waveform-generating circuit known from EP-A-0516229 is its great complexity: many powers and cross-terms with their associated coefficients are generated. However, this is accompanied by a great flexibility.

SUMMARY OF THE INVENTION

It is, inter alia an object of the invention to provide a method of generating a large variety of position-dependent correction waveforms having a small complexity.

To this end a first aspect of the invention provides a method of generating a position-dependent correction waveform (WCi) by generating p functions $(f_1(I1), \ldots, f_p(I1))$ from position information (I1), in which p is a natural number larger than 1, characterized in that the method further comprises the following steps of selecting q selected functions ($f_{n1}(I1), \ldots, f_{nq}(I1)$) from the p functions ($f_1(I1), \ldots, f_p(I1)$), in which q is a natural number which is larger than 0 and smaller than p, multiplying the q selected functions ($f_{n1}(I1), \ldots, f_{nq}(I1)$) each by an associated coefficient (al, ... ,aq), and adding the q selected functions ($f_{n1}(I1), \ldots, f_{nq}(I1)$) multiplied by the associated coefficient (al, ... ,aq), if q is larger than 1.

A second aspect of the invention provides a waveform-generating circuit comprising a function-generating circuit coupled to receive position information (I1) to supply p functions ($f_1(I1), \ldots, f_p(I1)$) of the position information (I1), in which p is a natural number which is larger than 1, characterized in that the waveform-generating circuit further comprises a selection circuit. coupled to receive the p functions ($f_1(I1), \ldots, f_p(I1)$) to supply q selected functions ($f_{n1}(I1), \ldots, f_{nq}(I1)$) selected from the p functions ($f_1(I1), \ldots, f_p(I1)$), in which q is a natural number which is larger than 0 and smaller than p, a coefficient circuit for supplying q coefficients (al, ... ,aq), coefficient multiplying means coupled to receive the q selected functions ($f_{n1}(I1), \ldots, f_{nq}(I1)$) and the q coefficients (al, ... aq) to supply the selected functions ($f_{ni}(I1)$) multiplied by the associated coefficients (ai), and if q is larger than 1, and an adder circuit coupled to receive the q selected functions ($f_{n1}(I1), \ldots, f_{nq}(I1)$) multiplied by the associated coefficients (al, ... ,aq) to supply a position-dependent correction waveform (WCi) based on an addition of the q selected functions ($f_{n1}(I1), \ldots, f_{nq}(I1)$) multiplied by the associated coefficients (al, ... ,aq).

A third aspect of the invention provides a picture display device adapted to regenerate horizontal synchronizing pulses (Hs) from a received synchronizing signal (S) for controlling a horizontal addressing unit (HDEF,HY) and for generating a horizontal position information (I1), regenerate vertical synchronizing pulses (Hv) from the received synchronizing signal (S) for controlling a vertical addressing unit (VDEF,VY), and for generating a vertical position information (Iv), and generate a position-dependent correction waveform (WCi) by generating p functions ($f_1(I1), \ldots, f_p(I1)$) from one of said position informations (I1,Iv), in which p is a natural number which is larger than 1, characterized in that the picture display device is further adapted to perform the following steps of selecting q selected functions ($f_{n1}(I1), \ldots, f_{nq}(I1)$) from the p functions ($f_1(I1), \ldots, f_p(I1)$), in which q is a natural number which is larger than 0 and smaller than p, multiplying the q selected functions ($f_{n1}(I1), \ldots, f_{nq}(I1)$) each by an associated coefficient (al, ... ,aq), and adding the q selected functions ($f_{n1}(I1) \ldots, f_{nq}(I1)$) multiplied by the associated coefficient (al, ... ,aq), if q is larger than 1.

The invention is based on the recognition that a large part of combinations of a display tube and associated horizontal and vertical deflection coils can be divided into groups, in which each group requires only a limited number of functions (for example, two powers) of one of the position informations for generating a correction waveform yielding a desired correction quality. The required functions differ per group. If the correct, associated functions are chosen for each group, it is sufficient to control the correction waveform by means of a minimum number of coefficients.

The afore-mentioned recognition has given rise to the fact that the waveform-generating circuit is implemented for generating the functions required to achieve the desired correction quality of said groups, while the total number of coefficients is minimized by first selecting the desired functions from the generated functions for a given group and by multiplying only these selected functions by a coefficient. The waveform-generating circuit has a large flexibility (with respect to possible waveforms) and a small complexity (a low number of coefficients). Substantially all (generally low-cost) combinations of the display tube and the associated horizontal and vertical deflection coils, each of which requires mutually different, simple corrections, may be driven in this way by means of the same (integrated) waveform-generating circuit which is as inexpensive as possible. The fact that the number of coefficients also essentially determines the complexity of the waveform-generating circuit may be apparent from the following. In an analog embodiment, in which the coefficients are adjusted via a digital bus, each multiplication of one of the functions by one of the coefficients consists of a complex circuit comprising an analog multiplier, a storage facility for storing a digital word defining the coefficient, and a D/A converter for converting the digital word to a control signal for the analog multiplier. It is alternatively possible to replace the D/A converter and the digital storage facility per multiplication by a simple analog sample-and-hold circuit. In this case, only one D/A converter is required, which stores the desired coefficient values as analog values in the sample-and-hold circuits. The number of coefficients also determines the size of an adder circuit for adding coefficient-multiplied functions. In a digital embodiment, each multiplication of one of the functions by one of the coefficients determines the size of the non-volatile, writable memory and the value and efficiency of a program code for the microcomputer.

An embodiment of a method of generating a position-dependent correction waveform according to the invention, characterized in that said position information (I1) is horizontal position information related to a horizontal position (Hs,Ih), and said selected functions ($s_{ni}(I1)$) are selected horizontal position functions, the method further comprising the following steps of generating r vertical position functions ($g_1(If), \ldots, g_r(If)$) from presented vertical position information (If) related to a vertical position (Vs,Iv), in which r is a natural number which is larger than 1, selecting s selected vertical position functions ($g_{n1}(If), \ldots, g_{ns}(If)$) from the r vertical position functions ($g_1(If), \ldots, g_r(If)$), in which s is a natural number which is larger than 0 and smaller than r, multiplying the s selected vertical position functions ($g_{n1}(If), \ldots, g_{ns}(If)$) each by an associated second coefficient (bl, ... ,bs), and adding the s selected vertical position functions ($g_{n1}(If), \ldots, g_{ns}(If)$), each multiplied by the associated second coefficient (bl, ... ,bs), to the q selected horizontal position functions ($f_{n1}(I1), \ldots, f_{nq}(I1)$) each multiplied by the associated first mentioned coefficient (al, ... ,aq), is based on the further recognition that a large part of said combinations can be divided into groups, in which only a limited number of functions of each position information is required for each group so as to achieve the desired correction quality. The required functions may differ per group. The associated waveform-generating circuit is implemented to generate the functions required to achieve the desired correction quality of said groups, but the total number of coefficients is minimized by first selecting the desired functions for a given group and by multiplying only these selected functions by a coefficient. The waveform-generating circuit has a great flexibility and a small complexity.

An embodiment of a method of generating a position-dependent correction waveform according to the invention, characterized in that the method further comprises the following steps of generating at least one cross-term ($T_{ij}, \ldots, T_{kl}$) by multiplying one of the q selected horizontal position functions ($f_{nl}(I1), \ldots, f_{nq}(I1)$) by one of the s selected vertical position functions ($g_{nl}(If), \ldots, g_{ns}(If)$), multiplying the at least one cross-term ($T_{ij}, \ldots, T_{kl}$) by an associated third coefficient (cij, . . . ,ckl), and adding the at least one cross-term ($T_{ij}, \ldots, T_{kl}$) multiplied by the associated third coefficient (cij, . . . ,ckl) to the q selected horizontal position functions ($f_{nl}(I1), \ldots, f_{nq}(I1)$) each multiplied by the associated first-mentioned coefficient (al, . . . ,aq) and to the s selected vertical position functions ($g_{nl}(If), \ldots, g_{ns}(If)$) each multiplied by the associated second coefficient (bl, . . . ,bs), and an embodiment of a waveform-generating circuit characterized in that said position information (I1) is horizontal position information related to a horizontal position (Hs,Ih), and said selected functions ($f_{nl}(I1), \ldots, f_{nq}(I1)$) are selected horizontal position functions, and in that the waveform generating circuit (WG) comprises a second function generating circuit coupled to receive vertical position information (If) related to the vertical position (Vs,Iv) to supply r vertical position functions ($g_l(If), \ldots, g_r(If)$) of the vertical position information (If), in which r is a natural number which is larger than 1, a second selection circuit coupled to receive the r vertical position functions ($g_1(If), \ldots, g_r(If)$) to supply s selected vertical position functions ($g_{nl}(If), \ldots, g_{ns}(If)$) selected from the r vertical position functions ($g_l(If), \ldots, g_r(If)$), in which s is a natural number which is larger than 0 and smaller than r, and a function multiplier coupled to receive a first function being one of the q selected horizontal position functions ($f_{nl}(I1), \ldots, f_{nq}(I1)$) and coupled to receive a second function being one of the s selected vertical position functions ($g_{nl}(If), \ldots, g_{ns}(If)$) to supply a cross-term (Tij) based on a multiplication of the first and the second function, the coefficient circuit is adapted to generate also a second set of s coefficients (bl, . . . ,bs) and a third set of at least one coefficient (cij, . . . ,ckl), the coefficient multiplier means is adapted to comprise, second coefficient multipliers for receiving one of the s selected vertical position functions ($g_{nl}(If), \ldots, g_{ns}(If)$) and an associated second coefficient (bj) from the second set of s coefficients (bl, . . . ,bs) to supply the selected vertical position function ($g_{nj}(If)$) multiplied by the associated second coefficient (bj), and at least one third coefficient multiplier coupled to receive the at least one cross-term ($T_{ij}, \ldots, T_{kl}$) and an associated third coefficient from the third set of at least one coefficient (cij, . . . ,ckl) to supply the at least one cross-term ($T_{nm}$) multiplied by an associated third coefficient (cnm), and the adder circuit is adapted to receive and add also the s selected vertical position functions ($g_{nl}(If), \ldots, g_{ns}(IF)$) multiplied by coefficient selected from the second set of s coefficients (bl, . . . ,bs), and the cross-term ($T_{ij}, \ldots, T_{kl}$) multiplied by the at least one coefficient (cij, . . . ,ckl) from the third set, are based on the recognition that a large part of said combinations can be divided into groups, in which only a limited number of functions (for example, 2 per position information) and associated cross-terms of the position information are required in each group so as to achieve the desired correction quality. The required functions may differ per group. The waveform-generating circuit is implemented to generate the functions required to achieve the desired correction quality of said groups, but the total number of coefficients is minimized by first selecting the desired functions for a given group, by multiplying only these selected functions so as to obtain cross-terms and by multiplying only these selected functions and the cross-terms by a coefficient. The waveform-generating circuit has a great flexibility and a small complexity.

An embodiment of a method of generating a position-dependent correction waveform according to the invention, characterized in that the method comprises the following steps of generating a first correction waveform having a first set of cross-terms ($T_{ij}, \ldots, T_{kl}$), generating a second correction waveform having a second set of cross-terms ($T_{ij}, \ldots, T_{kl}$), at least one cross-term $T_{mn}$ in the second set of cross-terms ($T_{ij}, \ldots, T_{kl}$) being unequal to each of the cross-terms of the first set of cross-terms ($T_{ij}, \ldots, T_{kl}$), and adding the first and the second correction waveforms, and an embodiment of a waveform-generating circuit, characterized in that a first waveform-generating circuit is adapted to generate a first correction waveform in which a first set of cross-terms ($T_{ij}, \ldots, T_{kl}$) occurs, a second waveform-generating circuit is adapted to generate a second correction waveform in which a second set of cross-terms ($T_{ij}, \ldots, T_{kl}$) occurs, at least one cross-term ($T_{mn}$) in the second set of cross-terms ($T_{ij}, \ldots, T_{kl}$) being unequal to each of the cross-terms of the first set of cross-terms ($T_{ij}, \ldots, T_{kl}$), and in that the adder circuit is adapted to add the first and the second correction waveforms, are based on the recognition that a more complex correction waveform is obtained by adding two or more position-dependent correction waveforms, each having at least a cross-term which does not occur in one of the other position-dependent correction waveforms. The correction waveform generated in this way can be used for the generally expensive combinations of display tube and associated horizontal and vertical deflection coils which are not associated with one of said groups, in which only a limited number of functions of one or more position information is required to achieve the desired correction quality. By generating two position-dependent correction waveforms in the integrated waveform-generating circuit, the same integrated waveform-generating circuit can perform two simple corrections when low-cost combinations of display tube and associated horizontal and vertical deflection coils are used, and one more complex waveform when expensive combinations of display tube and associated horizontal and vertical deflection coils are used.

An embodiment of a method of generating a position-dependent correction waveform according to the invention, characterized in that the adding is extended by also adding a coefficient a0 which is not multiplied by one of said selected position functions ($f_{nl}(I1), \ldots, f_{nq}(I1), g_{nl}(If), \ldots, g_{ns}(If)$) or one of the cross-terms ($T_{ij}, \ldots, T_{kl}$), provides the possibility of shifting the correction waveform as a whole.

An embodiment of a method of generating a position-dependent correction waveform according to the invention, characterized in that the method further comprises the following steps of dividing the horizontal position information (I1) into t sub-areas, in which t is a natural number which is larger than 0, indicating a value of each one of the first-mentioned coefficients (al, . . . ,aq) in each one of the t sub-areas, dividing the vertical position information (If) into u sub-areas, in which u is a natural number which is larger than 0, indicating a value of each one of the second coefficients (bl, . . . ,bs) in each one of the u sub-areas, and indicating a value of each one of the third coefficients (cij , . . . ,ckl) in each of the t*u fields obtained in this manner for the cross-terms ($T_{ij}, \ldots, T_{kl}$), divides the horizontal and vertical position information into t and u vertical sub-areas, respectively (which, for the purpose of comprehension, may be represented as a division of the display screen into t vertical and u horizontal strips, respectively). The coefficients associated with the functions of the horizontal position information are allocated an associated value in each of the t horizontal sub-areas. The coefficients associated with the functions of the horizontal position information may thus be considered to be split up into t coefficients each being active in an associated horizontal sub-area of the t horizontal sub-areas (or vertical strips). The coefficients associated with the functions of the vertical position information are allocated an associated value in each of the u vertical sub-areas. The division of the horizontal position information into t horizontal sub-areas and the vertical position information in u vertical sub-areas produces t times u fields being the intersection of each of the t horizontal sub-areas with each of the u vertical sub-areas. The coefficients associated with the cross-terms (i.e., functions of both the horizontal and the vertical position information) are allocated an associated value in each of the t*u sub-areas.

By making use of a split-up into sub-areas, a number of coefficients (and hence a number of control positions on the display screen) can be increased for obtaining a better convergence correction, either at an equal number of said functions and possible cross-terms, or the number of coefficients can be maintained equal by reducing the number of functions and possible cross-terms. The latter possibility reduces the complexity of the waveform-generating circuit to an even further extent, because fewer functions are to be generated for the same number of control positions. Practice has proved that a great many (notably the inexpensive) combinations of display tube and associated horizontal and vertical deflection coils can be corrected in this manner with a sufficiently satisfactory quality. In an analog embodiment, it is efficient to use the storage facility for storing the coefficients so as to fill each sub-area with the values representing the coefficients for the relevant sub-area. Then the storage facility need not be extended, but a facility will have to be provided for supplying or storing all of said coefficients, which facility may be, for example, a separate microcomputer, such as is already present in a picture display device for fulfilling other functions.

BRIEF DESCRIPTION OF THE DRAWINGS

These and other aspects of the invention will be apparent from and elucidated with reference to the embodiments described hereinafter.
In the drawing.

DESCRIPTION OF THE PREFERRED EMBODIMENTS

Figure 1:
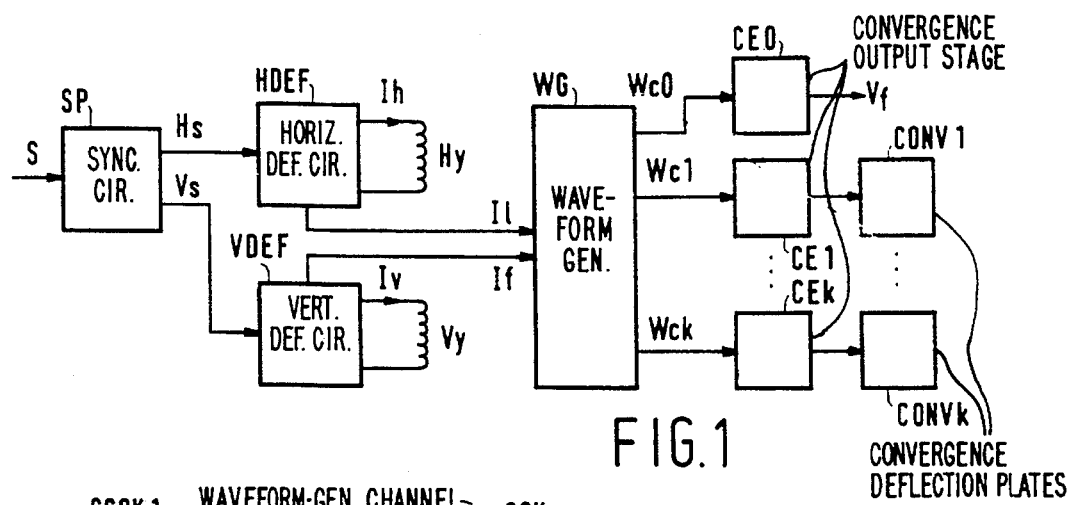
FIG. 1 is a block diagram of a picture display device provided with a waveform-generating circuit according to the invention.

FIG. 1 is a block diagram of a picture display device provided with a waveform-generating circuit WG according to the invention, in this case, by way of example, for use in a computer monitor having a display tube (not shown) which is provided with a display screen. The waveform generating circuit shown is suitable for correcting a convergence error and a focusing error. Horizontal synchronizing pulses Hs and vertical synchronizing pulses Vs are regenerated from a synchronizing signal S by means of a synchronizing circuit SP. The horizontal synchronizing pulses Hs are applied to a horizontal addressing unit HDEF,Hy, in this case comprising a horizontal deflection circuit HDEF which generates a horizontal deflection current Ih to be supplied to a horizontal deflection coil Hy for horizontally deflecting a composite electron beam consisting of separate electron beams (generally generating the primary colors red, green and blue). The vertical synchronizing pulses Vs are applied to a vertical addressing unit VDEF,Vy, in this case comprising a vertical deflection circuit VDEF which generates a vertical deflection current Iv to be supplied to a vertical deflection coil Vy for vertically deflecting the composite electron beam.

In a design of a combination of a display tube and associated horizontal deflection coils Hy and vertical deflection coils Vy (hereinafter referred to as combination), a compromise should often be made for many properties, for example a compromise between a convergence quality and the dimensions of the separate electron beams. One may choose to design a combination which is not self-convergent, in which simultaneously generated separate electron beams associated with the same electron beam reach the display screen due to deflection errors at such large position deviations that one (or all) of the separate primary colours becomes visible. The position deviations on the display screen of said separate electron beams can be corrected by generating a magnetic or electric correction field by means of convergence coils or convergence deflection plates CONV1, ..., CONVk, which correction field acts on one or more of the separate electron beams. For example, it may be necessary to generate four magnetic correction fields by means of four multi-pole coils arranged around the neck of the display tube for correcting: a. a red-blue offset in the horizontal position, referred to as rbx correction, b. a red-blue offset in the vertical position, referred to as rby correction, c. a green offset with respect to red and blue in the horizontal position, referred to as gx correction, and d. a green offset with respect to red and blue in the vertical position, referred to as gy correction. The required correction fields are determined by the type of correction (rbx, rby, gx, gy, ...), the combination design which has been chosen and tolerances of the combination. Generally, each correction depends on the position on the display screen, and, for example, an optimum rbx correction may be only dependent on the horizontal position, but also on both the horizontal and the vertical position. Suitable position-dependent correction fields are obtained by generating correction waveforms Wcl, ..., Wck by means of the waveform-generating circuit WG in dependence upon horizontal position information I1 and/or vertical position information If, and by presenting these correction waveforms Wcl, ... Wck via convergence output stages CE1, ..., CEk to the convergence coils or the convergence deflection plates CONV1, ..., CONVk. The horizontal position information I1 is related to the horizontal synchronizing pulse Hs, or to the real horizontal position on the display screen, which is related to the horizontal deflection current Ih. The vertical position information If is related to the vertical synchronizing pulse Hv, or to the real vertical position on the display screen, which is related to the vertical deflection current Iv. By way of example, the waveform-generating circuit WG also generates a focusing correction waveform Wc0 for driving a focusing output stage CE0 which generates a position-dependent focusing voltage Vf to be supplied to a focusing electrode (not shown) of the display tube. Also this focusing correction waveform Wc0, to be used for optimizing the diameter of the separate electron beams or of the composite electron beam, may depend on the horizontal position information I1 and/or the vertical position information If.

Figure 2:
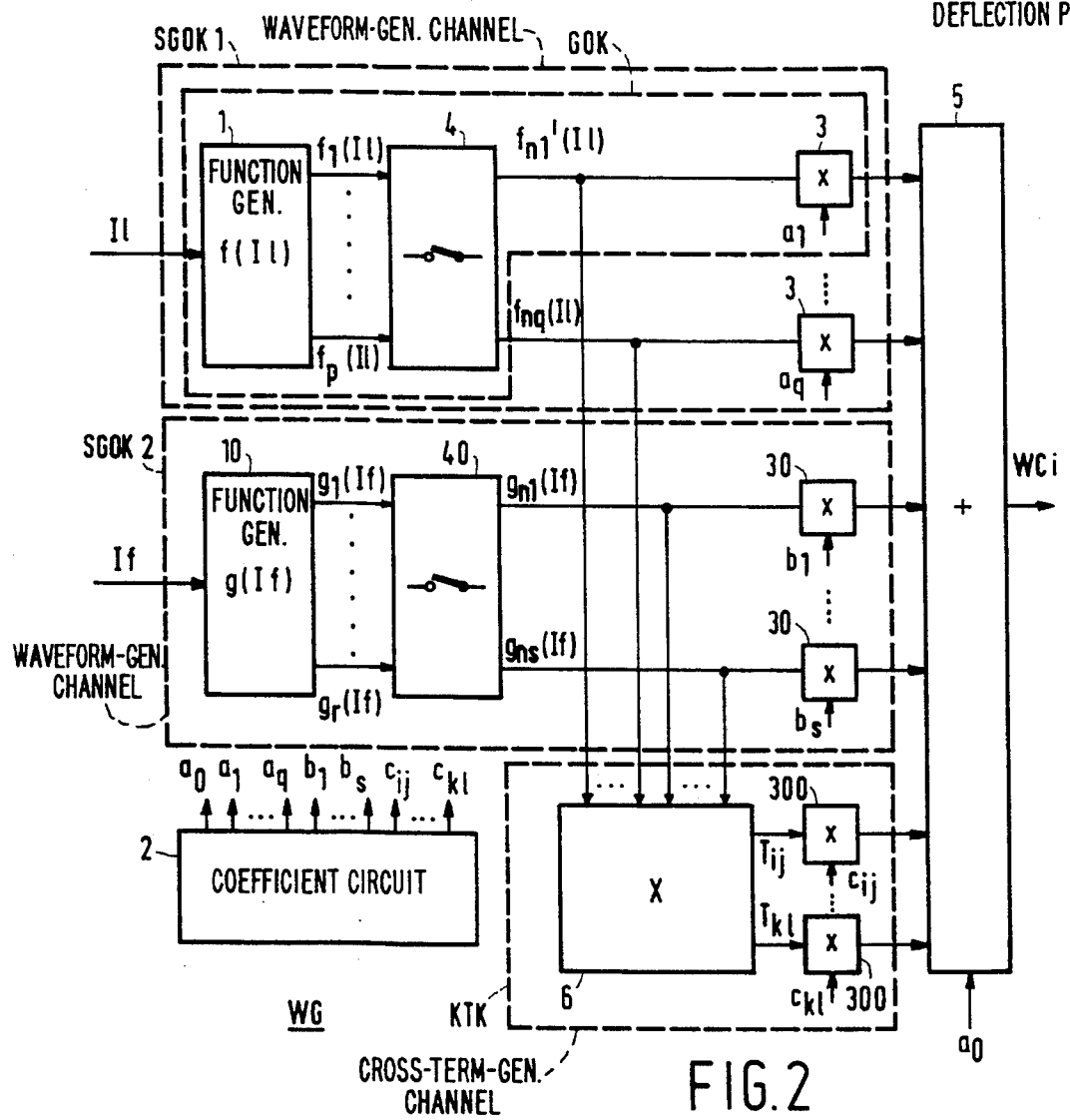
FIG. 2 is a block diagram of a waveform-generating circuit according to the invention.

FIG. 2 is a block diagram of a waveform-generating circuit WG according to the invention, which is suitable for generating a position-dependent correction waveform WCi. The waveform-generating circuit shown comprises, by way of example, a first composite waveform-generating channel SGOK1, a second composite waveform-generating channel SGOK2, a cross-term-generating channel KTK, a coefficient circuit 2, and an adder circuit 5.

Each composite waveform channel SGOK1,SGOK2 comprises: a function-generating circuit 1,10 for generating position functions fl(I1), . . . ,fp(I1),gl(If), . . . ,gr(If) of the presented position information I1,If, a selection circuit 4,40 for selecting at least one selected function fni(I1), gnj(If)from the position functions fl(il), . . . ,fp(I1),gl(If), . . . ,gr(If), and a plurality of coefficient multipliers 3,30 which is equal to the number of selected functions for multiplying a selected function fni(I1),gnj(If) by an associated coefficient ai,bj. A composite waveform-generating channel SGOK1,SGOK2, in which exactly one function fni(I1), gnj(If)is selected, is denoted by waveform channel GOK. The cross-term-generating channel KTK comprises a function multiplier 6 for receiving at least one of the selected functions fni(I1),gnj(If) of each composite waveform-generating channel SGOK1,SGOK2 and for supplying at least one crossterm Tij consisting of the multiplication of one of the selected functions fni(I1) of the first composite waveform-generating channel SGOK1 by one of the selected functions gnj(If) of the second composite waveform-generating channel SGOK2. A maximum number of cross-terms Tij, . . . ,Tkl is produced by multiplying each selected function fnl(I1), . . . ,fnq(I1) of the first composite waveform-generating channel SGOK1 by each selected function gnl(If), . . . ,gns(If) of the second composite waveform-generating channel SGOK2. The cross-term-generating channel KTK further comprises a plurality of coefficient multipliers 300 which is equal to the number of cross-terms Tij for multiplying each cross-term Tij by an associated coefficient cij. It is alternatively possible to use the selected functions fnl (I1), . . . ,fnq(I1);gnl(If), . . . ,gns(If) multiplied by the associated coefficients ai,bj for generating cross-terms. An extra coefficient A0 to be directly supplied to the adder circuit 5 provides a possibly required constant value to be added to the waveform.

The coefficient circuit 2 supplies all of said coefficients ai,bj,cij. The adder circuit 5 adds together all of said selected functions fni(I1),gnj(If) multiplied by coefficients ai,bj and cross-terms Tij multiplied by coefficients cij. Dependent on a desired complexity of the position-dependent correction waveform WCi, the waveform-generating circuit WG may also comprise only the waveform-generating channel GOK, or one of the composite waveform-generating channels SGOK1,SGOK2. The above description of the waveform-generating circuit WG is based on an analog or digital hardware implementation.

In an analog implementation, the coefficient circuit 2 is preferably provided with a storage facility for storing the coefficients ai,bj,cij as digital words which are applied to the coefficient multipliers 3,30,300 via D/A converters. In this way, a simple control of the coefficients ai,bj,cij is possible via a digital bus. The coefficient circuit 2 may also comprise potentiometers for adjusting the coefficients ai,bj,cij.

In a digital implementation, the coefficient circuit 2 is provided with a storage facility for storing the coefficients ai,bj,cij as digital words which are directly applied to digital coefficient multipliers 3,30,300, and analog position information I1,If is converted via D/A converters to position information consisting of digital words and suitable to be processed in digital function-generating circuits 1,10, and a correction waveform consisting of digital words may be converted via a D/A converter to the analog position-dependent correction waveform WCi.

It is alternatively possible to implement the waveform-generating circuit WG with a microcomputer which uses the position information consisting of digital words either directly or by means of a scratch memory for the purpose of computing the correction waveform. The generation of the position functions fl(I1), . . . ,fp(I1),gl (If), . . . ,gr(If), the selection of the selected functions fni(I1),gnj(If) from the position functions fl(I1), . . . ,fp(I1),gl(If), . . . ,gr(If), the generation of the cross-terms Tij, the multiplication by the coefficients ai,bj,cij and the addition of all selected functions fni(I1),gnj(If) and crossterms Tij multiplied by coefficients ai,bj,cij may then be laid down in a microcomputer program. The coefficients ai,bj,cij may be stored in a non-volatile, writable memory.

We claim:

1. A method of generating a position-dependent correction waveform (WCi) by generating p functions ($f_i$(I1), . . . ,($f_p$(I1)) from position information (I1), in which p is a natural number larger than 1, to ensure a position-dependent corrected display on a display device, wherein the method further comprises the following steps:

selecting, in dependence upon the display device, q selected functions ($f_{nl}$(I1), . . . ,$f_{nq}$(I1)) from the p functions ($f_i$(I1), . . . ,$f_p$(I1)), in which q is a natural number which is larger than 0 and smaller than p;

multiplying the q selected functions ($f_{nl}$(I1), . . . ,$f_{nq}$(I1)) each by an associated first coefficient (al, . . . ,aq); and adding the q selected functions ($f_{nl}$(I1), . . . ,$f_{nq}$(I1)) multiplied by the associated first coefficient (al, . . . ,aq), if q is larger than 1.

2. A method of generating a position-dependent correction waveform (WCi) as claimed in claim 1, characterized in that said position information (I1) is horizontal position information related to a horizontal position (Hs,Ih), and said selected functions ($s_{ni}$(I1)) are selected horizontal position functions, the method further comprising the following steps:

generating r vertical position functions ($g_i$(If), . . . ,$g_r$(If)) from the vertical position information (If) relating to a vertical position (Vs,Iv), in which r is a natural number which is larger than 1;

selecting s selected vertical position functions ($g_{nl}$(If), . . . ,$g_{ns}$(If)) from the r vertical position functions ($g_i$(If), . . . ,$g_r$(If)), in which s is a natural number which is larger than 0 and smaller than r;

multiplying the s selected vertical position functions ($g_{nl}$(If), . . . ,$g_{ns}$(If)) each by an associated second coefficient (bl, . . . ,bs); and adding the s selected vertical position functions ($g_{nl}$(If), . . . ,$g_{ns}$(If)), each multiplied by the associated second coefficient (bl, . . . ,bs), to the q selected horizontal position functions ($f_{nl}$(I1), . . . ,$f_{nq}$(I1)) each multiplied by the associated first coefficient (al, . . . ,aq).

3. A method of generating a position-dependent correction waveform (WCi) as claimed in claim 2, characterized in that the method further comprises the following steps:

generating at least one cross-term ($T_{ij}$, . . . ,$T_{kl}$) by multiplying one of the q selected horizontal position functions ($f_{nl}$(I1), . . . ,$f_{nq}$(I1)) by one of the s selected vertical position functions ($g_{nl}$(If) , . . . ,$g_{ns}$(If)) ;

multiplying the at least one cross-term ($T_{ij}$, . . . ,$T_{kl}$) by an associated third coefficient (cij, . . . ,ckl); and adding the at least one cross-term $(T_{ij}, \ldots, T_{kl})$ multiplied by the associated third coefficient (cij), . . . ,ckl) to the q selected horizontal position functions $(f_{nl}(I1), \ldots, f_{nq}(I1))$ each multiplied by the associated first coefficient (al, . . . ,aq) and to the s selected vertical position functions $(g_{nl}(If), \ldots, g_{ns}(If))$ each multiplied by the associated second coefficient (bl, . . . ,bs).

4. A method of generating a position-dependent correction waveform (WCi) as claimed in claim 3, characterized in that the method comprises the following steps:

using the steps of generating at least one cross-term, multiplying the at least one cross-term, and adding the at least one cross-term to generate a first correction waveform having a first set of cross-terms $(T_{ij}, \ldots, T_{kl})$ and a second correction waveform having a second set of cross-terms $(T_{ij}, \ldots, T_{kl})$, at least one cross-term $T_{mn}$ in the second set of cross-terms $(T_{ij}, \ldots, T_{kl})$ being unequal to each of the cross-terms of the first set of cross-terms $(T_{ij}, \ldots, T_{kl})$; and adding the first correction waveform and the second correction waveform.

5. A method of generating a position-dependent correction waveform (WCi) as claimed in claim 1, characterized in that the adding is extended by also adding a coefficient a0 which is not multiplied by one of said selected position functions $(f_{nl}(I1), \ldots, f_{nq}(I1), g_{nl}(If), \ldots, g_{ns}(If))$ or one of the cross-terms $(T_{ij}, \ldots, T_{kl})$.

6. A method of generating a position-dependent correction waveform as claimed in claim 3, characterized in that the method further comprises the following steps:

dividing the horizontal position information (I1) into t sub-areas, in which t is a natural number which is larger than 0;

indicating a value of each one of the first-mentioned coefficients (al, . . . ,aq) in each one of the t sub-areas;

dividing the vertical position information (If) into u sub-areas, in which u is a natural number which is larger than 0;

indicating a value of each one of the second coefficients (bl, . . . ,bs) in each one of the u sub-areas; and indicating a value of each one of the third coefficients (cij, . . . ,ckl) in each of the t*u fields obtained in this manner for the cross-terms $(T_{ij}, \ldots, T_{kl})$.

7. A waveform-generating circuit comprising:

a function-generating circuit coupled to receive position information (I1) to supply p functions $(f_l(I1), \ldots, f_p(I1))$ of the position information (I1), in which p is a natural number which is larger than 1, characterized in that the waveform-generating circuit further comprises:

a selection circuit coupled to receive the p functions $(f_l(I1), \ldots, f_p(I1))$ to supply q selected functions $(f_{nl}(I1), \ldots, f_{nq}(I1))$ selected from the p functions $(f_l(I1), \ldots, f_p(I1))$, in which q is a natural number which is larger than 0 and smaller than p;

a coefficient circuit for supplying q coefficients (al, . . . ,aq);

coefficient multiplying means coupled to receive the q selected functions $(f_{nl}(I1), \ldots, f_{nq}(I1))$ and the q coefficients (al, . . . ,aq) to supply the selected functions $(f_{ni}(I1))$ multiplied by the associated coefficients (ai), and if q is larger than 1;

an adder circuit coupled to receive the q selected functions $(f_{nl}(I1), \ldots, f_{nq}(I1))$ multiplied by the associated coefficients (al, . . . ,aq) to supply a position-dependent correction waveform (WCi) based on an addition of the q selected functions $(f_{nl}(I1), \ldots, f_{nq}(I1))$ multiplied by the associated coefficients (al, . . . ,aq).

8. A waveform-generating circuit (WG) as claimed in claim 7, characterized in that said position information (I1) is horizontal position information related to a horizontal position (Hs,Ih), and said selected functions $(f_{nl}(I1), \ldots, f_{nq}(I1))$ are selected horizontal position functions, and in that the waveform generating circuit (WG) comprises:

a second function generating circuit coupled to receive vertical position information (If) related to the vertical position (Vs,Iv) to supply r vertical position functions $(g_l(If), \ldots, g_r(If))$ of the vertical position information (If), in which r is a natural number which is larger than 1;

a second selection circuit coupled to receive the r vertical position functions $(g_1(If), \ldots, g_r(If))$ to supply s selected vertical position functions $(g_{nl}(If), \ldots, g_{ns}(If))$ selected from the r vertical position functions $(g_l(If), \ldots, g_r(If))$, in which s is a natural number which is larger than 0 and smaller than r; and a function multiplier coupled to receive a first function being one of the q selected horizontal position functions $(f_{nl}(I1), \ldots, f_{nq}(I1))$ and coupled to receive a second function being one of the s selected vertical position functions $(g_{nl}(If), \ldots, g_{ns}(If))$ to supply a cross-term (Tij) based on a multiplication of the first and the second function, the coefficient circuit also generating a second set of s coefficients (bl, . . . ,bs) and a third set of at least one coefficient (cij, . . . ,ckl);

the coefficient multiplier means comprising:

second coefficient multipliers for receiving one of the s selected vertical position functions $(g_{nl}(If), \ldots, g_{ns}(If))$ and an associated second coefficient (bj) from the second set of s coefficients (bl, . . . ,bs) to supply the selected vertical position function $(g_{nj}(If))$ multiplied by the associated second coefficient (bj), and at least one third coefficient multiplier coupled to receive the at least one cross-term $(T_{ij}, \ldots, T_{kl})$ and an associated third coefficient from the third set of at least one coefficient (cij, . . . ,ckl) to supply the at least one cross-term $(T_{nm})$ multiplied by an associated third coefficient (cnm); and the adder circuit is adapted to receive and add also the s selected vertical position functions $(g_{nl}(If), \ldots, g_{ns}(If))$ multiplied by coefficient selected from the second set of s coefficients (bl, . . . ,bs), and the cross-term $(T_{ij}, \ldots, T_{kl})$ multiplied by the at least one coefficient (cij, . . . ,ckl) from the third set.

9. A waveform-generating circuit (WG), characterized in that a first waveform-generating circuit as claimed in claim 8, for generating a first correction waveform in which a first set of cross-terms $(T_{ij}, \ldots, T_{kl})$ occurs;

a second waveform-generating circuit, substantially similar to said first waveform-generating circuit, for generating a second correction waveform in which a second set of cross-terms $(T_{ij}, \ldots, T_{kl})$ occurs, at least one cross-term $(T_{mn})$ in the second set of cross-terms $(T_{ij}, \ldots, T_{kl})$ being unequal to each of the cross-terms of the first set of cross-terms $(T_{ij}, \ldots, T_{kl})$, and in that the adder circuit adds the first and the second correction waveform.

10. A picture display device comprising:

means for regenerating horizontal synchronizing pulses (Hs) from a received synchronizing signal (S) for controlling a horizontal addressing unit (HDEF,HY) and for generating a horizontal position information (I1);

means for regenerating vertical synchronizing pulses (Hv) from the received synchronizing signal (S) for controlling a vertical addressing unit (VDEF,VY), and for generating a vertical position information (Iv); and means for generating a position-dependent correction waveform (WCi) by generating p functions ($f_l(I1), \ldots, f_p(I1)$) from one of said position informations (I1,Iv), in which p is a natural number which is larger than 1, characterized in that the picture display device further comprises:

means for selecting q selected functions ($f_{nl}(I1), \ldots, f_{nq}(I1)$) from the p functions ($f_l(I1), \ldots, f_p(I1)$), in which q is a natural number which is larger than 0 and smaller than p;

means for multiplying the q selected functions ($f_{nl}(I1), \ldots, f_{nq}(I1)$) each by an associated coefficient (al, . . . ,aq); and means for adding the q selected functions ($f_{nl}(I1), \ldots, f_{nq}(I1)$) multiplied by the associated coefficient (al, . . . ,aq), if q is larger than 1.

* * * * *